United States Patent
Hu et al.

(10) Patent No.: US 10,182,040 B2
(45) Date of Patent: Jan. 15, 2019

(54) SYSTEMS AND METHODS FOR SINGLE DEVICE AUTHENTICATION

(71) Applicants: Hongyi Hu, Aromas, CA (US); Chad S. Spensky, Cambridge, MA (US)

(72) Inventors: Hongyi Hu, Aromas, CA (US); Chad S. Spensky, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 181 days.

(21) Appl. No.: 15/178,320

(22) Filed: Jun. 9, 2016

(65) Prior Publication Data

US 2017/0310647 A1  Oct. 26, 2017

Related U.S. Application Data

(60) Provisional application No. 62/173,468, filed on Jun. 10, 2015.

(51) Int. Cl.
*H04L 9/32* (2006.01)
*H04L 29/06* (2006.01)
(Continued)

(52) U.S. Cl.
CPC .......... *H04L 63/0442* (2013.01); *G06F 21/53* (2013.01); *G06F 21/602* (2013.01);
(Continued)

(58) Field of Classification Search
CPC ....... G06F 21/33; G06F 21/602; H04L 63/04; H04L 63/0442; H04L 63/0876;
(Continued)

(56) References Cited

U.S. PATENT DOCUMENTS

2012/0331550 A1* 12/2012 Raj .................... G06F 21/53
726/22
2013/0281058 A1* 10/2013 Obaidi .................. H04W 12/06
455/411

(Continued)

OTHER PUBLICATIONS

Abadi et al., Authentication and delegation with smart-cards. Science of Computer Programming. 1993;21:93-113.

(Continued)

*Primary Examiner* — Gary S Gracia
(74) *Attorney, Agent, or Firm* — McCarter & English, LLP; David R. Burns

(57) ABSTRACT

Described are systems, methods, and computer readable medium for authenticating user device interactions with external entities. A secure communication session is established between an external device or application and a trusted execution environment. An authentication request is received from the external application or device at the trusted execution environment. A secure communication channel is established between the trusted execution environment and an input/output interface of the user authentication device. Input is received from a user assurance action related to the authentication request over the secure communication channel. Data is encrypted at a secure element of the user authentication device, and a response is transmitted including the encrypted data and an indicator of the user assurance action to the external application or device from the trusted execution environment in response to the authentication request via the secure communication session.

23 Claims, 8 Drawing Sheets

(51) Int. Cl.
- G06F 21/60 (2013.01)
- G06F 21/53 (2013.01)
- G06F 21/72 (2013.01)
- H04L 9/08 (2006.01)
- H04W 12/06 (2009.01)
- G06F 21/00 (2013.01)
- G06F 21/33 (2013.01)

(52) U.S. Cl.
CPC ............ *G06F 21/72* (2013.01); *H04L 9/0844* (2013.01); *H04L 9/321* (2013.01); *H04L 9/3263* (2013.01); *H04L 63/0853* (2013.01); *H04W 12/06* (2013.01); *G06F 21/33* (2013.01); *G06F 2221/2113* (2013.01); *H04L 9/08* (2013.01); *H04L 9/0825* (2013.01); *H04L 63/0272* (2013.01); *H04L 63/04* (2013.01); *H04L 63/0823* (2013.01); *H04L 63/0876* (2013.01); *H04L 63/102* (2013.01); *H04L 63/166* (2013.01); *H04L 2209/56* (2013.01)

(58) Field of Classification Search
CPC ....... H04L 63/102; H04L 9/08; H04L 9/0825; H04L 9/321
See application file for complete search history.

(56) References Cited

U.S. PATENT DOCUMENTS

| | | | | |
|---|---|---|---|---|
| 2014/0164254 A1* | 6/2014 | Dimmick | ........... | G06Q 20/4012 705/71 |
| 2014/0289833 A1* | 9/2014 | Briceno | ........... | H04L 63/08 726/7 |
| 2014/0317686 A1* | 10/2014 | Vetillard | ........... | G06F 21/74 726/2 |
| 2014/0325594 A1* | 10/2014 | Klein | ........... | H04L 63/08 726/2 |
| 2015/0007265 A1* | 1/2015 | Aissi | ........... | G06F 21/60 726/3 |
| 2015/0071437 A1* | 3/2015 | Chastain | ........... | H04L 9/3273 380/249 |
| 2015/0100788 A1* | 4/2015 | Chastain | ........... | H04L 63/0807 713/169 |
| 2015/0149776 A1* | 5/2015 | Chastain | ........... | H04L 63/0869 713/169 |
| 2015/0294304 A1* | 10/2015 | Donnellan | ........... | G06Q 20/12 705/44 |
| 2017/0109751 A1* | 4/2017 | Dunkelberger | .... | G06Q 20/4014 |

OTHER PUBLICATIONS

Aldo Cortesi, mitmproxy 0.9 (index.html). Retrieved online at: https:/corte.si/posts/codeimitmproxy/announce0_9/ Index.html. 4 pages, May 15, 2013.

Amrutkar et al., Measuring SSL Indicators on Mobile Browsers: Extended Life, or End of the Road? Gollmann D., Freiling F.C. (eds) Information Security. ISC 2012. Lecture Notes in Computer Science. 2012;7483:86-103.

Azab et al., Hypervision Across Worlds: Real-time Kernel Protection from the Arm TrustZone Secure World. CCS'14, pp. 90-102, Nov. 3-7, 2014.

Bauer et al., Device-Enabled Authorization in the Grey System. Zhou J. (ed) Information Security. ISC 2005. Lecture Notes in Computer Science. 2005;3650:431-445.

Bauer et al., Lessons Learned From the Deployment of a Smartphone-Based Access-Control System. Symposium on Usable Privacy and Security (SOUPS), 12 pages, Jul. 18-20, 2007.

Bianchi et al., What the App is That? Deception and Countermeasures in the Android User Interface. IEEE Symposium on Security and Privacy. 18 pages, May 17-21, 2015.

Bonneau et al., The Quest to Replace Passwords: A Framework for Comparative Evaluation of Web Authentication Schemes. IEEE Symposium on Security and Privacy. 15 pages, (2012).

Brainard et al., Fourth-Factor Authentication: Sombody You Know. CCS'06. 11 pp., Oct. 3-Nov. 6, 2006.

Chen et al., Lightweight Anonymous Authentication with TLS and DAA for Embedded Mobile Devices. Information Security, 18 pages, (2011).

Lark et al., SoK: SSL and HTTPS: Revisiting past challenges and evaluating certificate trust model enhancements. IEEE Symposium on Security and Privacy. pp. 511-525, (2013).

Clayton et al., The Extended iSelf: The Impact of iPhone Separation on Cognition, Emotion, and Physiology. Journal of Computer-Mediated Communication Mar. 2015;20(2):119-135.

Cronto, www.cronto.com. 3 pages, (2018).

Czeskis et al., Strengthening User Authentication through Opportunistic Cryptographic Identity Assertions. CCS'12, 11 pages, Oct. 16-18, 2012.

Das, The Tangled Web of Password Reuse. NDSS'14, 15 pages, Feb. 23-26, 2014.

David et al., Cloaker: Hardware Supported Rootkit Concealment. IEEE Symposium on Security and Privacy. pp. 1-15, May 18-22, 2008.

Dierks et al., The Transport Layer Security (TLS) Protocol, Version 1.2. Network Working Group. 104 pages, Aug. 2008.

Diffie et al., New Directions in Cryptography. IEEE Transactions on Information Theory. Nov. 1976;IT-22(6):644-654.

Ellison et al., Ten Risks of PKI: What You're not Being Told about Public Key Infrastructure. Computer Security Journal. 2000;16(1):1-7.

FIDO Alliance, Simpler, Stronger Authentication. FIDO is the World's Largest Ecosystem for Standards-Based, Interoperable Authentication. Retrieved online at: www.fidoalliance.org. 4 pages, (2018).

Ge et al., Sprobes: Enforcing Kernel Code Integrity on the TrustZone Architecture. Proceedings of the Third Workshop on Mobile Security Technologies (MoST). 10 pages, (2014).

Gibson Research Corporation, SQRLSQRL, Secure Quick Reliable Login, SQRL Resources. 4 pages, Aug. 2, 2015.

Greene et al., I Can't Type That! P@$$w0rd Entry on Mobile Devices. Tryfonas, T. (Ed.) HAS 2014, LNCS. Springer International Publishing, Switzerland. 2014;8533:160-171.

Gutmann et al., PKI: It's Not Dead, Just Resting. Computer. Aug. 2002;35(8):41-49.

Hancke, Practical Attacks on Proximity Identification Systems. Proceedings of the 2006 IEEE Symposium on Security and Privacy. pp. 328-333, May 21-24, 2006.

Herley et al., A Research Agenda Acknowledging the Persistence of Passwords. IEEE Security & Privacy. Jan.-Feb. 2012;10(1):28-36.

Herley et al., Passwords: If We're So Smart, Why Are We Still Using Them? Dingledine R. (Ed.) Financial Cryptography and Data Security. FC 2009. Lecture Notes in Computer Science. 2009;5628:230-237.

Herley et al., So Long, And No Thanks for the Externalities: The Rational Rejection of Security Advice by Users. NSPW'09, pp. 1-12, Sep. 8-11, 2009.

Hunt, Have I Been Pwned? www.haveibeenpwned.com. Retrieved online at: Wikipedia.com. 4 pages, (2013).

Ives et al., The Domino Effect of Password Reuse. Communications of the ACM. Apr. 2004;47(4):75-78.

Jakobsson, How to Wear Your Password. Qualcomm Technologies, Inc. 13 pages, (2014).

Kerr et al., PEAR: A Hardware Based Protocol Authentication System. SPRINGL'10, 8 pages, Nov. 2, 2010.

Koblitz, Elliptic Curve Cryptosystems. Mathematics of Computation. Jan. 1987;48(177):203-209.

Kostiainen, On-board Credentials: An Open Credential Platform for Mobile Devices. Doctoral Dissertation. Aalto University, School of Science, Department of Computer Science and Engineering. 78 pages, May 25, 2012.

Lampson et al., Authentication in Distributed Systems: Theory and Practice. ACM Trans Computer Systems. Nov. 1992;10(4):265-310.

(56) References Cited

OTHER PUBLICATIONS

Laurie et al., Choose the red pill and the blue pill: a position paper. NSPW'08, Proceedings of the 2008 New Security Paradigms Workshop. pp. 127-133, Sep. 22-25, 2008.
Li et al., Building Trusted Path on Untrusted Device Drivers for Mobile Devices. APSys '14. 7 pages, Jun. 25-26, 2014.
Li et al., The Emperor's New Password Manager: Security Analysis of Web-based Password Managers. 23rd USENIX Security Symposium. pp. 465-479, Aug. 20-22, 2014.
Mannon et al., Leveraging Personal Devices for Stronger Password Authentication from Untrusted Computers. Financial Cryptography and Data Security, FC'07. 29 pages, (2007).
McCune et al., Safe Passage for Passwords and Other Sensitive Data. NDSS Symposium, 20 pages, Feb. 9, 2009.
McCune et al., Seeing-Is-Believing: Using Camera Phones for Human-Verifiable Authentication. IEEE Symposium on Security and Privacy, S&P'05. 22 pages, May 8-11, 2005.
McMillan, The World's First Computer Password? It Was Useless Too. Retrieved online at: https://www.wired.com/2012/01/computer-password/, 3 pages, Jan. 27, 2012.
Parno et al., Phoolproof Phishing Prevention. Di Crescenzo G., Rubin A. (eds) Financial Cryptography and Data Security. FC 2006. Lecture Notes in Computer Science. 2006;4107:1-19.
Pinto et al., Towards a lightweight embedded virtualization architecture exploiting ARM TrustZone. Proceedings of the 2014 IEEE Emerging Technology and Factory Automation (ETFA), 4 pages, Sep. 16-19, 2014.
Poushter, Internet Seen as Positive Influence on Education but Negative on Morality in Emerging and Developing Nations. Internet Usage More Common Among the Young, Well-Educated and English Speakers. PewResearchCenter. 77 pages, Mar. 19, 2015.
Rivest et al., A Method for Obtaining Digital Signatures and Public-Key Cryptosystems. Communications of the ACM. Feb. 1978;21(2):120-126.
Rosenberg, Reflections on Trusting TrustZone. Retrieved online at: https://www.blackhat.com, 33 pages, (2014).
Schechter et al., Ifs Not What You Know, But Who You Know. A Social Approach to Last-resort Authentication. CHI 2009—Security and Privacy. pp. 1983-1992, Apr. 9, 2009.
Schechter et al., The Emperor's New Security Indicators. An evaluation of website authentication and the effect of role playing on usability studies. The 2007 IEEE Symposium on Security and Privacy. 15 pages, May 20-23, 2007.
Sheng et al., Why Johnny Still Can't Encrypt: Evaluating the Usability of Email Encryption Software. SOUPS, ACM, 2 pages, (2006).
Silver et al., Password Managers: Attacks and Defenses. 23rd USENIX Security Symposium. 16 pages, Aug. 20-22, 2014.
Stajano, Pico: No more passwords! Proceedings Security Protocols Workshop. 34 pages, Aug. 31, 2011.
Sun et al., oPass: A User Authentication Protocol Resistant to Password Stealing and Password Reuse Attacks. IEEE Transactions on Information Forensics and Security. Apr. 2012;7(2):651-663.
Sun et al., SecureSwitch: BIOS-Assisted Isolation and Switch between Trusted and Untrusted Commodity OSes. NDSS, 15 pages, (2012).
Sun et al., TrustDump: Reliable Memory Acquision on Smartphones. European Symposium on Research in Computer Security, ESORICS 2014;8712:202-218.
Sunshine et al., Crying Wolf: An Empirical Study of SSL Warning Effectiveness. 18th USENIX Security Symposium. 18 pages, Aug. 10-14, 2009.
Turner, Preparing for and Responding to Certification Authority Compromise and Fraudulent Certificate Issuance. ITL Bulletin, NIST: National Institute of Standards and Technology/U.S. Department of Commerce. 9 pages, Jul. 2012.
Van Rijswijk-Deij et al., Using Trusted Execution Environments in Two-factor Authentication: comparing approaches. Proceedings of the Open Identity Summit. pp. 20-31, (2013).
Vasudevan et al., Trustworthy Execution on Mobile Devices: What security properties can my mobile platform give me? International Conference on Trust and Trustworthy Computing. pp. 159-178, (2012).
Whitten et al., Why Johnny Can't Encrypt. A Usability Evaluation of PGP 5.0. Security and Usability: Design Secure Systems that People Can Use. L. Cranor (Ed.). O'Reilly. Chapter 34, pp. 679-702, (2005).
Yan et al., Password Memorability and Security: Empirical Results. IEEE Security & Privacy. pp. 25-31, Sep./Oct. 2004.
Zhang et al., The Security of Modern Password Expiration: An Algorithmic Framework and Empirical Analysis. CCS'10, 11 pages, Oct. 4-8, 2010.
Zhang et al., TrustLogin: Securing Password-Login on Commodity Operating Systems. Asia CCS'15, 12 pages, Apr. 14-17, 2015.
Zhao et al., Providing Root of Trust for ARM TrustZone using On-Chip SRAML. TrustED '14 Proceedings of the 4th International Workshop on Trustworthy Embedded Devices. pp. 25-36, Nov. 3, 2014.

\* cited by examiner

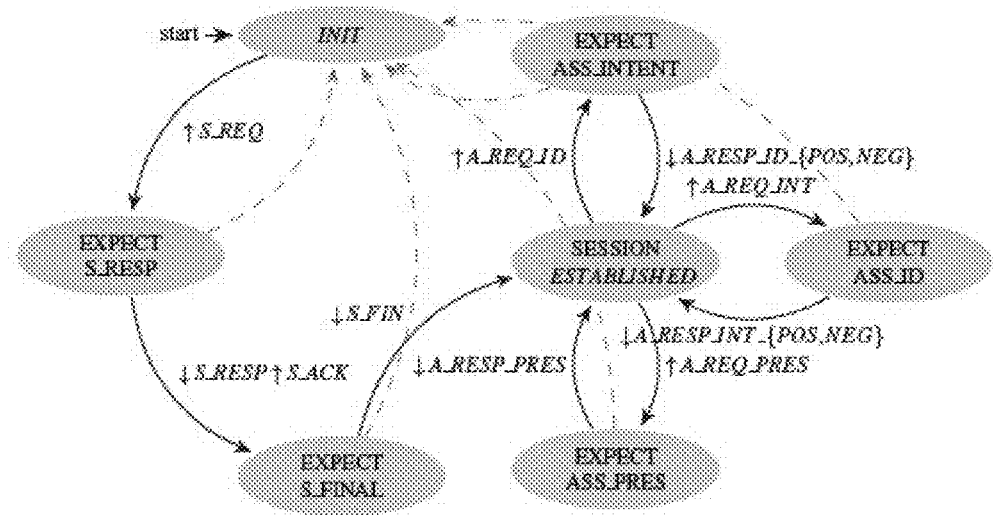
FIG. 6A Verifier
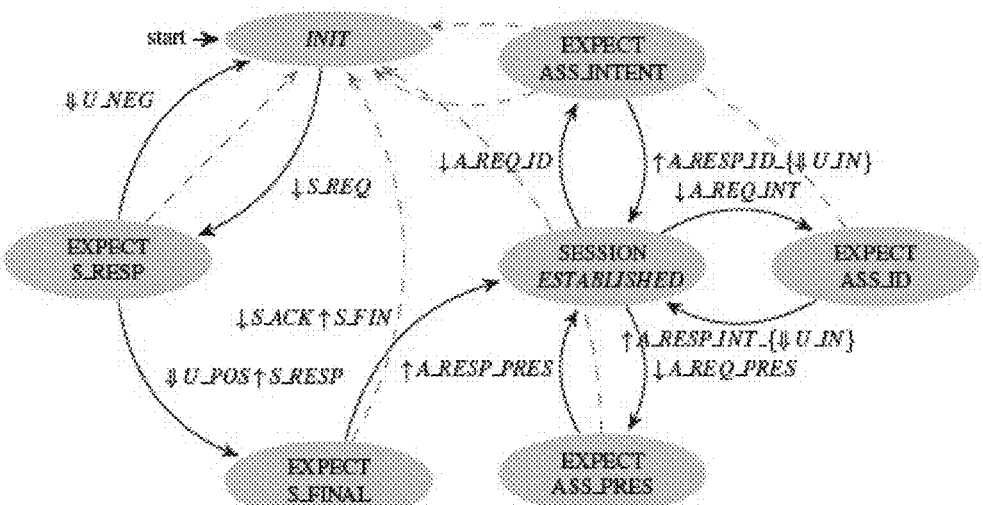
FIG. 6B Authentication Device

SYSTEMS AND METHODS FOR SINGLE DEVICE AUTHENTICATION

RELATED APPLICATION

This application claims the benefit of, and priority to, U.S. Provisional Patent Application No. 62/173,468 filed on Jun. 10, 2015, which is hereby incorporated by reference in its entirety.

STATEMENT OF GOVERNMENT INTEREST

This invention was made with Government support under Contract No. FA8721-05-C-0002 awarded by the U.S. Air Force. The Government has certain rights in the invention.

BACKGROUND

With the increased use of technology, authentication for certain activities and interactions between devices and services has become more important. Many conventional authentication schemes are burdensome on the user, and inhibit usability and scalability. Some conventional authentication schemes require users to memorize a password for each service or device. Other authentication schemes require the use of additional hardware.

BRIEF SUMMARY

Systems, methods and computer readable medium are provided for device authentication. In one embodiment, a method for authenticating user device interactions with an external application or device is provided. The method includes establishing a secure communication session between trusted code and the external application or device. The trusted code executes within a trusted execution environment in a user authentication device, and the external application or device is external to the trusted execution environment. The method also includes receiving an authentication request from the external application or device at the trusted execution environment over the secure communication session. The authentication request requires a user assurance action. The method further includes establishing a secure communication channel between the trusted execution environment and an input/output interface of the user authentication device. A user assurance action related to the authentication request is received over the secure communication channel. The method encrypts data at a secure element of the user authentication device based on the authentication request, and transmits a response to the authentication request that includes the encrypted data and an indicator of the user assurance action. The response is transmitted to the external application or device from the trusted execution environment over the secure communication session.

In another embodiment, a system for authenticating user device interactions with an external application or device is provided. The system includes a user authentication device including a processor configured to interact with a trusted execution environment, an input/output interface, and a secure element. The user authentication device is configured to establish a secure communication session between trusted code executing within the trusted execution environment of the user authentication device and the external application or device, where the external application or device is external to the trusted execution environment. The trusted execution environment is configured to receive an authentication request from the external application or device over the secure communication session. The authentication request requires a user assurance action. The trusted execution environment is also configured to establish a secure communication channel between the trusted execution environment and the input/output interface of the user authentication device, and receive input from a user assurance action related to the authentication request over the secure communication channel. The secure element is configured to encrypt data based on the authentication request. The trusted execution environment is further configured to transmit a response to the authentication request that includes the encrypted data and an indicator of the user assurance action to the external application or device over the secure communication session.

In another embodiment, a non-transitory computer readable medium is provided storing instructions executable by a processor for authenticating user device interactions with an external application or device that when executed causes a user authentication device to establish a secure communication session between trusted code and the external application or device. The trusted code executes within a trusted execution environment having access to a processor in a user authentication device. The execution of the instructions also causes the user authentication device to receive an authentication request from the external application or device at the trusted execution environment over the secure communication session. The authentication request requires a user assurance action. Additionally, the execution of the instructions causes the user authentication device to establish a secure communication channel between the trusted execution environment and an input/output interface of the user authentication device, and receive input from a user assurance action related to the authentication request over the secure communication channel. The execution of the instructions further causes the user authentication device to encrypt data at a secure element of the user device based on the authentication request, and transmit a response to the authentication request that includes the encrypted data and an indicator of the user assurance action. The response is transmitted to the external application or device from the trusted execution environment over the secure communication session.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings:

FIG. 6A depicts a state diagram for the third party verifier, according to an example embodiment;

FIG. 6B depicts a state diagram for the user authentication device, according to an example embodiment;

DESCRIPTION OF EXEMPLARY EMBODIMENTS

Figure 1:
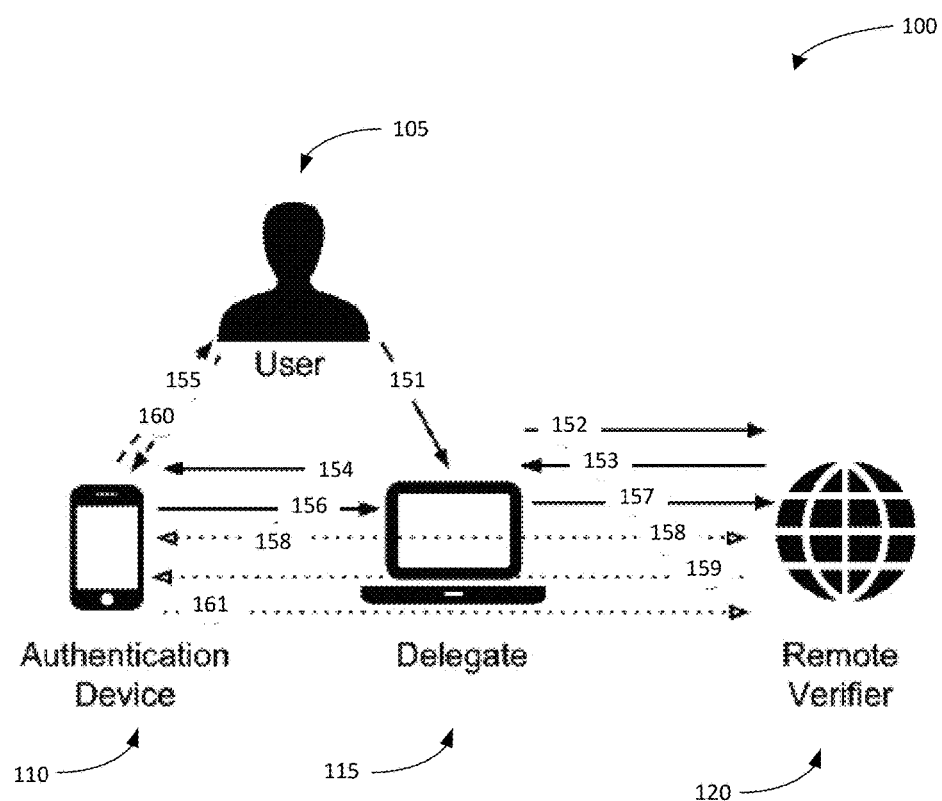
FIG. 1 depicts data flow between a user, user authentication device and an external application or device, according to an example embodiment.

Described in detail herein are systems, methods, and computer readable medium for authenticating interactions between a user device and third party applications and devices. In one embodiment, the device authentication system described herein uses a trusted execution environment (TEE) of the user device to establish a secure communication session between a trusted code base executing within the TEE and a third party application or device (verifier) that requires authentication. The TEE is also used to establish a secure communication channel to the input/output interface of the user authentication device. A secure element (SE) for the user authentication device is used to encrypt certificates and shared keys to establish the secure communication sessions with the third party application or device. To inform the user of the trusted secure session, a security image may first be displayed prior to the user entering input. This security image may be stored in the SE to limit the possibility of tampering by unauthorized parties. As further described below, the device authentication system may also provide various levels of assurances for different levels of security actions.

In one embodiment, the TEE may be may be provided by the processor of the user authentication device. In other embodiments, the TEE may be a separate module included in a co-processor of the authentication device, may be provided in secure RAM, may be provided using a peripheral bus, or the like. It will be appreciated that in still other embodiments a user authentication device may provide a trusted execution environment other than those specifically listed herein without departing from the scope of the present invention.

The third party entities or verifiers, as used herein, may be an external application or device external to the TEE of the user authentication device. For example, the external application may be remotely located from the user authentication device or may be installed on the user authentication device. In another example, an external device (e.g., server) may be controlled by an entity or user who is also in control of the user authentication device.

The delegate may be a device or application to which the user can delegate some privileges in order to take some action. The delegate may be a laptop, an application on a laptop, or an application on the user authentication device. The delegate may be a device, application or service that the user is interacting with or using (e.g., a web browser) to interact with the third-party verifier. The delegate may initialize the connection, and when security critical tasks are being performed, the delegate may request that the appropriate assurance is presented via the user authentication device.

Existing authentication schemes are quickly becoming unmanageable as the number of services requiring unique credentials continues to increase. Passwords have numerous inherent cognitive limitations, and existing hardware-based solutions continue to suffer in both scalability and usability. The device authentication system described herein addresses these problems by enabling users to authenticate via a single capable hardware device (e.g., a smartphone). This single device can then act on behalf of the user to authenticate interactions with numerous services using strong cryptographic algorithms in an easy and intuitive way. The device authentication system eliminates some types of credential-based attacks (e.g., cracking, key logging, phishing, etc.), while also being resistant to device-based malware. The device authentication system described herein is not reliant on Internet connectivity or third-party interaction to perform authentication and is practical for performing authentication for both traditional digital applications (e.g., computer login, websites) and for the cyber-physical domain (e.g., doors, automobiles). The device authentication system of the present invention is built on an assurance model that is capable of providing the full spectrum of authentication-based assurances, in addition to a bi-directional trusted path to the user.

While passwords have long been the de facto method of authentication between users and computer systems, they are quickly becoming less than optimal for modern computing needs. The root of the problem arises from the inability of most users to recall the large number of complex passwords required on the Internet. This problem is exacerbated by advances in password cracking, the proliferation of credential-stealing malware, and the ever-increasing number of services that require unique credentials. Conventional solutions to alleviate this mental burden on the users include augmenting password-based schemes (e.g., two-factor, autofill), using physical tokens (e.g., SecurID, smart cards), or leveraging biometrics (e.g., fingerprint, iris). However, while these conventional solutions are easier to use, many of these schemes are not well-suited for large-scale deployment, and may rely on untrusted third-party infrastructure. Moreover, in the face of malware, many of these existing schemes can be completely undermined.

The device authentication system of the present invention that is described herein provides users with a usable, scalable, and secure hardware-based authentication mechanism. The device authentication system permits users to use a single device to satisfy all of their authentication needs across various domains, both digital (e.g., desktop computers, websites) and physical (e.g., doors, automobiles). This is achieved by pairing the authentication device in a secure manner (e.g., by generating asymmetric key-pairs) with every entity that the user interacts with and pinning (i.e., permanently storing) those paired credentials. The device authentication system can then leverage the previously paired credentials to create a secure communication session between the device and the service to be used for satisfying authentication-based needs for all future interactions.

Unlike many conventional authentication schemes, which perform authentication at the beginning of the protocol and then proceed to use the "authenticated" channel, the device authentication system uses a hardware token-based assurance model that provides granular assurances (i.e., presence, intent, identification) in addition to a bi-directional trusted path between the user and service. For example, every security-critical task will require a minimum assurance of presence, which establishes the authentication device is present, while more sensitive tasks require user interaction (i.e., intent or identification). A non-limiting example of a user providing presence assurance includes automatically providing presence assurance when the user authentication device is in proximity of the third-party verifier device (e.g., door sensor on a car or a building). A non-limiting example of a user providing intent assurance includes a user actively assenting to a message displayed on a user interface on the user authentication device, where the message is requesting the user to confirm his or her intent to interact with the third party verifier. A non-limiting example of a user providing identification assurance includes the user entering a code or PIN, or providing his or her fingerprint via the secure input interface of the user authentication device.

In one embodiment, the device authentication system has a minimal trusted computing base (TCB) that only includes a small amount of code for handling user interaction, credential management, and a data processing protocol. This minimalist approach permits the device authentication system to adopt a particularly strong attacker model, and assume that everything outside of the small, centralized TCB is untrusted. This may include the main operating system on the user authentication device, all communication channels, and every delegate device or application that the user may use to interact with the device authentication system. This framework permits the device authentication system to easily support a variety of communication interfaces, as these implementations are simply handling cryptograms that are being exchanged between the TCB and the verifying third party service. Similarly, by ensuring that user credentials never leave the highly-fortified storage within the TCB and that a trusted path is provided between the TCB and the user, the device authentication system is able to mitigate the danger posed by numerous credential-based attacks. For example, an user of the single device authentication system described herein can conduct their banking activities on a public, malware-infested, delegate computer, with less concern about unauthorized access while using the device authentication system.

The single device authentication system described herein also provides an authentication framework that can be used to replace a wide variety of existing authentication schemes, and is not targeted at any specific domain. The device authentication system described herein can scale arbitrarily for users, as the users only need to remember how to identify themselves to their user authentication device. To this end, the device authentication system does not prescribe a specific authentication mechanism to identify the user, as both the security requirements and the availability of required hardware (e.g., fingerprint reader) are likely to vary. Instead, the device authentication system is capable of processing different mechanisms to identify the user in the assurance model and permit the third party verifiers and users to decide on the specific mechanism for each authentication request.

Embodiments of the present invention leverage key technological advancements make the device authentication system viable. The ubiquitous adoption of smartphones as integral part of the users' lives and the universal inclusion of secure elements in smartphones, which provide an isolated, tamper-resistant, hardware environment for credential storage and cryptographic operations are two of these advances. Another technological advance utilized by embodiments is the introduction of trusted execution environments which provide hardware-enforced segregation for security-critical code, as well as an ability to restrict peripheral access when that code is executing. It should be appreciated that although a smartphone is the preferred and most likely user authentication device used to perform the single device authentication described herein, the device authentication system can be implemented on many different types of computing device to authenticate user interactions with third party services.

The device authentication system described herein provides three levels of assurance for authentication. The first level, "Presence" establishes that the authentication device be available to complete the action. The second level "Intent" establishes that proposed action was explicitly intended by the intended human user. The third level "Identification" establishes that the proposed action was explicitly intended by an authorized user.

As an example of the levels of assurance that may be provided by the use of the device authentication system, a user may be able to interact with his or her "smart home" using his or her authentication device (i.e., smartphone) to turn on the lights, play music, etc. Subsequently the user may be able to turn off the lights and music, and lock the doors as he or she leaves the house. He or she then may unlock the car using the same authentication device (i.e., intent assurance), and push a button to start the car once in the driver's seat (i.e., intent assurance). On the way to the office, he or she may again use the same device to purchase breakfast (i.e., intent assurance). At the office, he or she may use this authentication device to enter the office building (i.e., identification assurance), as well as his or her office door (i.e., intent assurance). Finally, this same authentication device may also unlock his or her desktop computer (i.e., presence assurance), and enable interactions with third party services without the need for any additional authentication mechanism. Centralizing all of the user's credentials in one authentication device is convenient while also providing a highly fortified security architecture. Moreover, as this device will serve as the user's only source for authentication there is an inherent need for it to support a large variety of communication interfaces, in addition to providing the user with an enjoyable experience.

In one embodiment, the device authentication system assumes that every intermediary device and communication channel between the TCB and the third party verifier is untrusted. Specifically the device authentication system assumes that the attacker has privileged code execution on any delegate and on the device itself, outside of the TCB. Similarly, the device authentication system assumes the attacker can manipulate any of the communication channels between the third party verifier and the TCB. The device authentication system assumes that an attacker may have non-invasive physical access to the device. To address these assumptions, the configuration employed by an embodiment of the device authentication system may include the following: 1) a secure session between the TCB and the third party device or service provides integrity and authenticity for all of the messages in the device authentication system protocol; 2) a trusted execution environment (TEE) provides an isolated environment on the device for the TCB; 3) a secure I/O mechanism provides a trusted path between the TCB and the user; and 4) a secure element (SE) provides a tamper-resistant environment for storing and manipulating credentials. In this configuration a compromised remote service is unable to steal the user's credentials or leveraged to compromise other services. Additionally, this configuration provides a comparatively small TCB (i.e., the code executing in the TEE) to both audit and secure.

Both TEEs and SEs are already widely deployed on existing smartphones and preferably embodiments make use of both a TEE and SE. However, these hardware-based features (i.e., the TEE and SE) may not always be available and other embodiments may lack one or the other. In that case, their absence changes certain security assumptions. The SE provides a secure storage environment for credentials that is hardened against hardware and software based attacks. The TEE is also hardened against software-based attacks, and can provide many of the same security assurances that the SE does. Because of the hardware isolation already provided by the TEE, an implementation of the device authentication system can be resistant against software-based attacks (i.e., trusted path, malware resistant), but the credentials may be vulnerable to hardware-based attacks in the absence of the SE.

In an example embodiment, in the event the TEE cannot be utilized to implement the device authentication system described herein, it is still possible to use the SE. In that case, the device authentication system's security relies on the operating_system kernel, as the SE can protect the credentials from both software and hardware-based theft, but still permit kernel-level malware to utilize the credentials without the user's knowledge. In particular, the device authentication system relies on the interactions between the system's protocol and the user to be secure (i.e., trusted path), and that the system's data is secure (i.e., TEE). Thus, while kernel-level malware on the user's authentication device could utilize the users' credentials without their knowledge, it could not infiltrate or copy them to be used without the hardware device.

In another example embodiment where no hardware-based features are available, the device authentication system may function in the same environment as existing mobile apps, relying solely on the mobile operating system to enforce segregation for the TCB, trusted path, and credentials.

The user's hardware device is referred to herein as the authentication device or the user authentication device. The human user who owns and is authorized to use the authentication device is referred to as the user. This authentication device can communicate with external authentication verifiers, or third party verifiers that provide applications or servers for services, as well as intermediary delegates. Before any device with the device authentication system can communicate with a third party verifier, they first pair to establish shared keys which can then be utilized to establish a secure session. This secure session enables secure and authenticated communication to take place between the trusted code executing in the trusted execution environment on the authentication device and the third party verifier. Upon establishing a session, either party may then request an authenticated action with a required assurance.

In one embodiment, the device authentication system also utilizes a secure input/output (I/O) to provide a trusted path between the authentication device and the user over which the user can satisfy authentication-based assurances and data encryption which enables the third party verifier to request the authentication device to encrypt or decrypt a particular piece of data with a privacy key stored on the user authentication device. The assurance requirements (i.e., intent and identification) are satisfied by interacting with the user using the secure I/O interface on the device and returning the appropriate response. This same interface can be utilized for providing a secure channel for the exchange of action-specific information (e.g., confirming a financial transaction or entering a social security number) and makes possible a bi-directional trusted path between the user and the third party verifier.

The single device authentication environment as described herein allows the device authentication system to minimize the amount of user interaction by only requesting the minimum assurance level for each action. Additionally, the device authentication system can support a wide range of authentication-related tasks. For example, while browsing a website, all of the pages may require presence of the device, which requires no user interaction. However, a request for a more security-critical task (e.g., a request to transfer funds) requires interaction with the user (i.e., the request requires intent or identification) for that specific action. Then, the user is able to verify the action using the trusted path enabled by the device authentication system. The ability of the device authentication system to achieve all three levels of assurance, with a trusted path and encryption is a significant improvement over existing authentication schemes (which at most only provide a portion of this functionality, such as only identification without a trusted path, in non-scalable manners). Moreover, by ensuring that every assurance level in the device authentication system inherently requires the authentication device, any attempts to steal or utilize the user's credentials from a delegate that may receive or store the user credentials are thwarted without the cooperation of the user authentication device.

FIG. 1 depicts data flow 100 between a user 105, user authentication device 110, delegate 115 and third party remote verifier 120, according to an example embodiment. More particularly, FIG. 1 shows an example of using the single device authentication system to interact with a web-based service 120 through a delegate 115 (for example, a laptop). The user 105 need not trust the delegate, as it is simply a middle-man or intermediary device in the device authentication system protocol.

At step 151 the user 105 requests a protected action on the web service (e.g., transfer funds) that is routed to the third party verifier 120 via the delegate 115 at step 152. At step 153 the third party verifier 120 issues a secure session request, which the delegate 115 forwards to the authentication device 110 (step 154). At step 155 if a secure session does not already exist, the user 105 is prompted to either pair or establish a new session with the third party verifier 120. At steps 156 and 157 the response, which identifies the authentication device 110, is forwarded to the verifier 120. At step 158, the authentication device 110 and the verifier 120 establish a secure session, using the previously paired keys. At step 159 the verifier 120 issues an assurance request (e.g., transfer $X to Y account?). At step 160 the user 105 enters input that satisfies the requested assurance, and at step 161 the authentication device 110 responds appropriately to the third party verifier 120.

At step 153 the session request from the verifier 120 is targeted at the user authentication device 110, instead of the browser or delegate 115. Once the authentication device 110 and verifier 120 agree on the credentials (steps 153-157), with the user's approval, they can establish a secure channel for all future communication (step 158). Upon establishing a secure channel, the verifier 120 can then issue requests for authentication, with specified assurance requirements. By permitting the verifier 120 to specify the required assurance level for each action, the device authentication system permits each service to weigh their own security versus usability tradeoffs, and implement their own pseudo-protocol using the assurance model provided by the device authentication system described herein. For example, a blog may require presence assurance to view, intent assurance to write, and identification assurance to delete. If user interaction is required (e.g., intent assurance, identification assurance) or secure I/O is being used (e.g., request input, display a message, etc.), the user is then prompted (step 160), and the response is returned (step 161).

Figure 2:
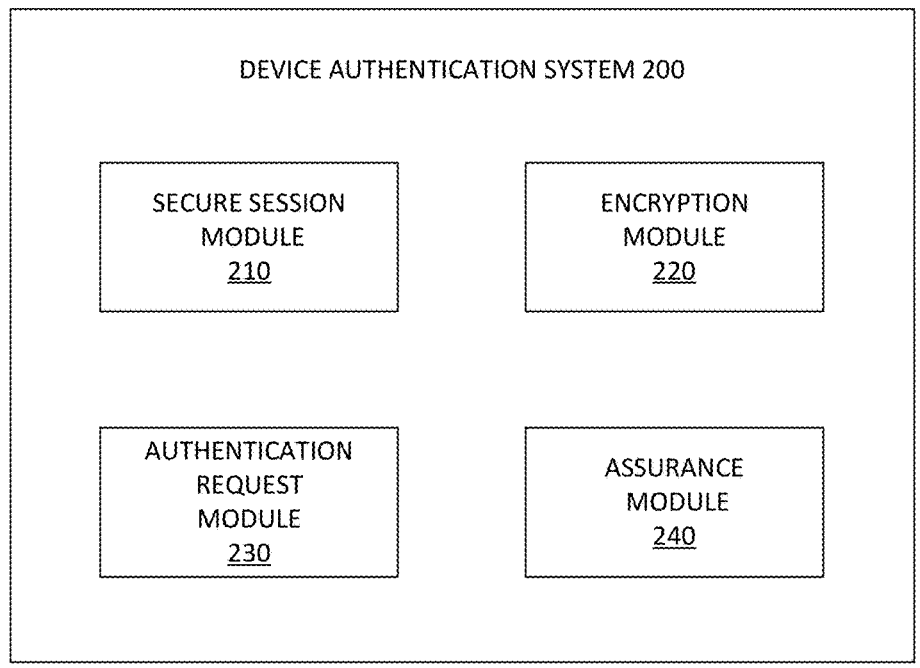
FIG. 2 is a block diagram showing a device authentication system implemented in modules, according to an example embodiment.

FIG. 2 is a block diagram showing a device authentication system 200 implemented in modules, according to an example embodiment. Some or all of the modules may be executable only within a trusted execution environment on a user authentication device as described herein. The modules may include a secure session module 210, an encryption module 220, an authentication request module 230, and an assurance module 240. One or more of the modules of system 200 may be implemented in user device 710 of FIG. 7. The modules may include various circuits, circuitry and one or more software components, programs, applications, or other units of code base or instructions configured to be executed by one or more processors included in user device 710. Although modules 210, 220, 230, and 240 are shown as distinct modules in FIG. 2, it should be understood that modules 210, 220, 230, and 240 may be implemented as fewer or more modules than illustrated.

The secure session module 210 may be configured to establish and manage secure communication sessions between the user authentication device 110 and the third party verifier 120. The secure session module 210 may store information related to the secure session the first time it is established. The secure session module 210 may be responsible for establishing and storing shared keys for pairing the authentication device 110 and the third party verifier 120. Once a secure session is established, the secure session module 210 may continue to monitor communications during the session. Subsequent requests for authentication from the same third party verifier 120 may not require establishing a new secure session. In that case, the secure session module 210 retrieves the stored shared keys to enable secure communications within the device authentication protocol described herein.

The encryption module 220 may be configured to encrypt and decrypt data with a privacy key stored on the authentication device 110. The encryption module may operate on or in communication with a secure element.

The authentication request module 230 may be configured to receive, generate and manage authentication requests between the user authentication device 110 and the third party verifier 120.

The assurance module 240 may be configured to receive and manage various levels of assurance requests, such as presence assurance, intent assurance and identity assurance. The assurance module 240 may also be configured to receive input or interactions from the user via the secure I/O port of the authentication device 110 in response to an assurance request.

Figure 3:
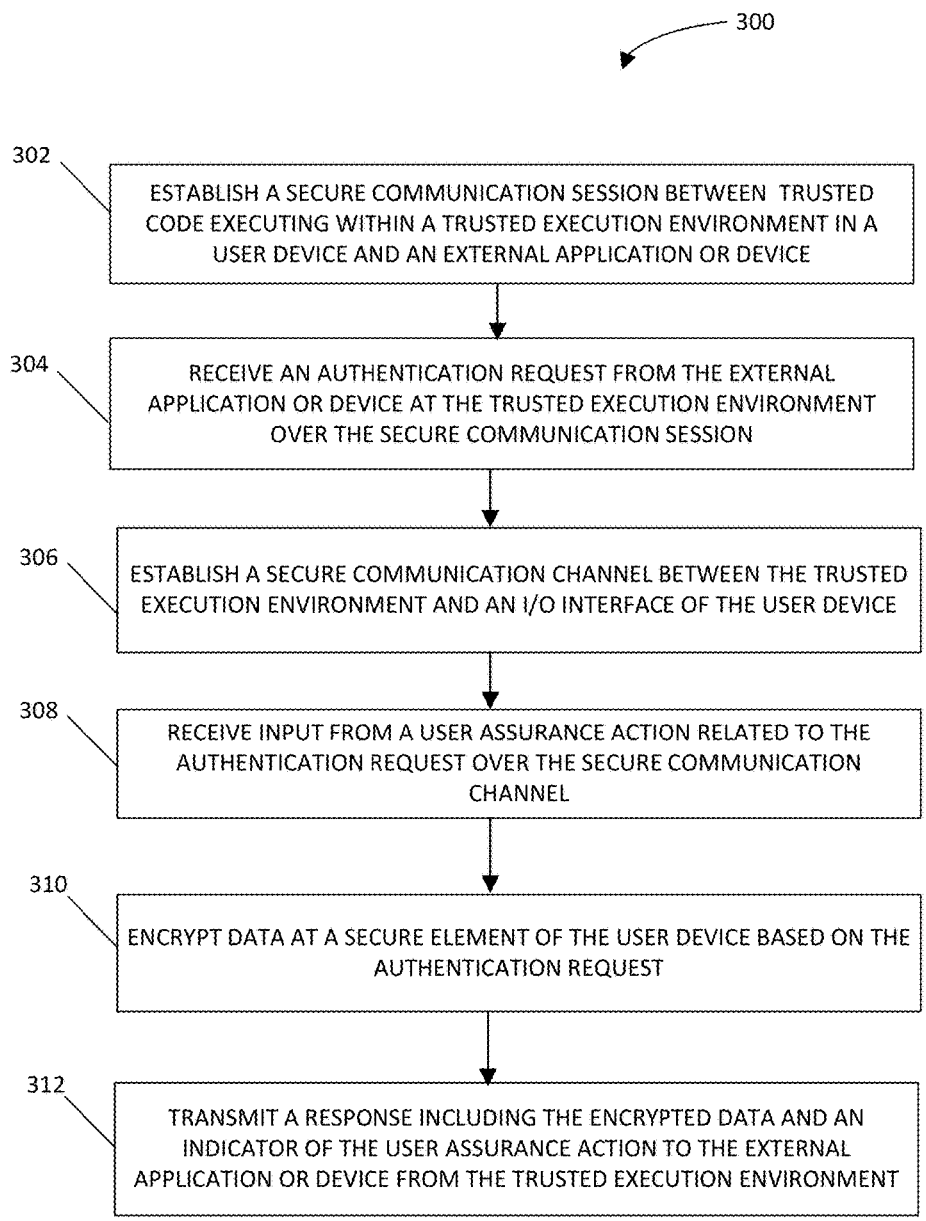
FIG. 3 is a flowchart showing an exemplary method for authenticating user device interactions with an external application or device, according to an example embodiment.

FIG. 3 is a flowchart showing an exemplary method 300 for authenticating user device interactions with third party entities, according to an example embodiment. The steps of method 300 may be performed by one or more modules of system 200 shown in FIG. 2.

At step 302, the secure session module 210 establishes a secure communication session between trusted code executing in a trusted execution environment (TEE) in the user authentication device 110 and a third party application or device (e.g., third party verifier 120).

In an example embodiment, the secure session module 210 generates asymmetric key-pairs for the third party application or device and the user authentication device 110. The session module 210 stores the key-pairs as paired credentials in the secure element (SE) of the user authentication device 110. The secure session module 210 establishes the secure communication session between the user authentication device 110 and the third party application or device based on the generated key-pairs.

In another example embodiment, the secure session module 210 searches the secure memory (e.g., SE) of the user authentication device for stored key-pairs for the third party application or device, and establishes the secure communication session between the user authentication device and the third party application or device based on locating the stored key-pairs. In this manner, if a secure session was previously established with the third party verifier, then a subsequent secure session is established based on the stored key-pairs and user credentials.

At step 304, the authentication request module 230 receives an authentication request from the third party application or device at the TEE over the secure communication session. At step 306, the secure session module 210 establishes a secure communication channel between the TEE and the I/O interface of the authentication user device 110.

At step 308, the assurance module 240 receives input from a user assurance action related to the authentication request over the secure communication channel. In an example embodiment, before receiving the input, the device authentication system provides the assurance action over the secure communication channel accompanied by the display of an image previously stored by the user in secure memory (e.g., SE) as an indication of the communication channel being secure. In some embodiments, a security phrase may also be included with the security image.

At step 310, the encryption module 220 encrypts data at the SE of the user authentication device 110 based on the authentication request. At step 312, the authentication request module 230 transmits a response including the encrypted data and an indicator of the user assurance action to the third party application or device (e.g., third party verifier 120) from the TEE.

In an example embodiment, the SE of the user authentication device is a smart card. In an alternative embodiment, the SE of the user authentication device is a SIM card on the user's smartphone. In an example embodiment, the input/output interface of the user authentication device is a touchscreen interface of the user authentication device or a camera of the user device.

Figure 4:
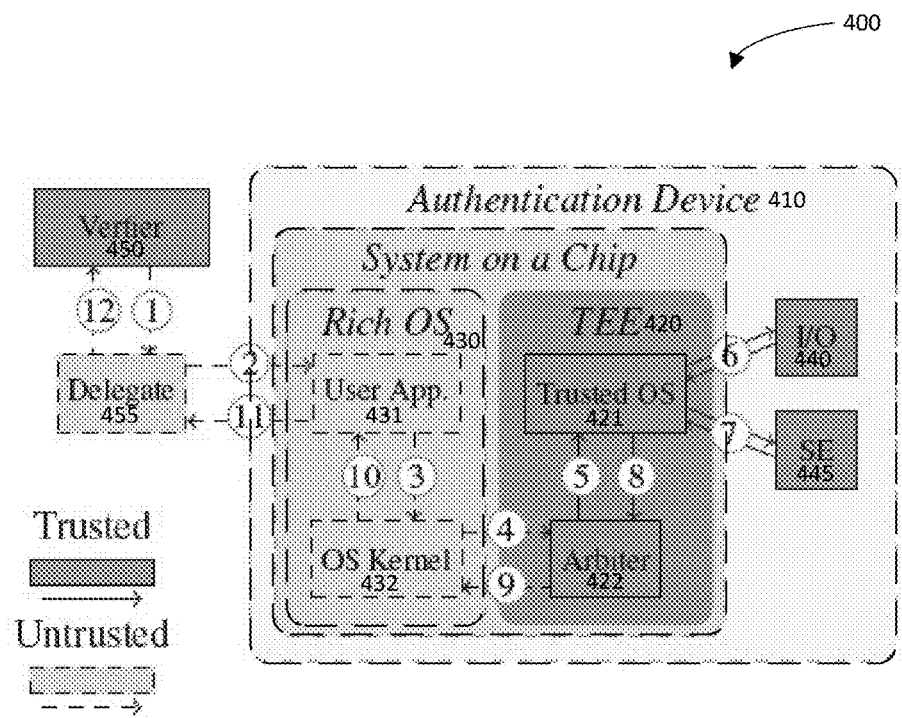
FIG. 4 illustrates data flow within the user device implementing the device authentication system, according to an example embodiment.

FIG. 4 illustrates data flow 400 within the user authentication device 410 implementing the device authentication system, according to an example embodiment. FIG. 4 shows authentication request handling using the device authentication system after establishing a secure session between the verifier 450 and the trusted code 421 and 422 provided by the trusted execution environment (TEE) 420. The authentication device 410 includes a TEE 420 that executes trusted code including a trusted OS 421 and an arbiter 422. The authentication device 410 also includes a rich OS (unsecured OS) that provides user applications 431 and the OS kernel 432. The TEE 420 and rich OS 430 may be provided by a system on a chip (SoC) or a processor included in the authentication device 410. The authentication device 410 also includes an I/O interface 440 and a secure element (SE) 445. The SE 445 may be a smart card or a SIM card of a smartphone.

At step 1, the third party verifier requests authentication. In an example embodiment, the delegate 455 routes the request to the authentication device 410 (step 2). The request may be received at the rich OS 430 of the authentication device 410. At steps 3-4, the request may be routed to the TEE 420 via the OS kernel 432 using a secure session. At step 5, the arbiter 422 configures the authentication device 410 into a secure state and hands off execution. At step 6, a trusted path with the device's I/O interface 440 is established to interact with the user. At step 7, the SE 445 is utilized to perform any cryptographic operations. At step 8, the arbiter cleans up any sensitive data used to satisfy the authentication or assurance request. At steps 9-12, the response message is returned to the third party verifier 450 using the secure session via the rich OS 430 and the delegate 455.

FIG. 4 outlines the steps that are required to fulfill a verifier's request for authentication using the device authentication system in an example embodiment, which uses TEE. The untrusted operating system (e.g., Android) is referred to as the rich OS 430. The SE 445 and I/O interface 440 may be shared between the rich OS 430 and TEE 420. The device authentication system leverages the TEE 420 to establish secure channels with the device's peripherals. Within the TEE 420, the arbiter 422 executes the code that handles the context switching of the processor between the trusted and untrusted environments. In an example embodiment, the arbiter is an optional component. The device authentication system specific code and the associated micro-kernel are referred to as the trusted OS 421. In an example embodiment, the delegate (for example an external device) is treated the same as applications running in the rich OS 430. The delegate may be utilized to handoff data between the third party verifier 450 and the authentication device 410.

While establishing a secure channel is important, adequately conveying this state information to the user is also, important. To combat various masquerading attacks, the device authentication system may employ a security image that is entered by the user from within the TEE (e.g., using the camera) and then stored in secure memory, thwarting any attempts to recover the image from outside of the TEE. Additionally, unique background colors and vibration patterns may be employed as well as distinct icons and text to indicate the type of message that is being presented. This helps to ensure that the secure nature of the message type can be quickly and easily discerned by the user. Also, the third party verifier's image, name, and action-specific message for the request may be displayed.

Figure 5:
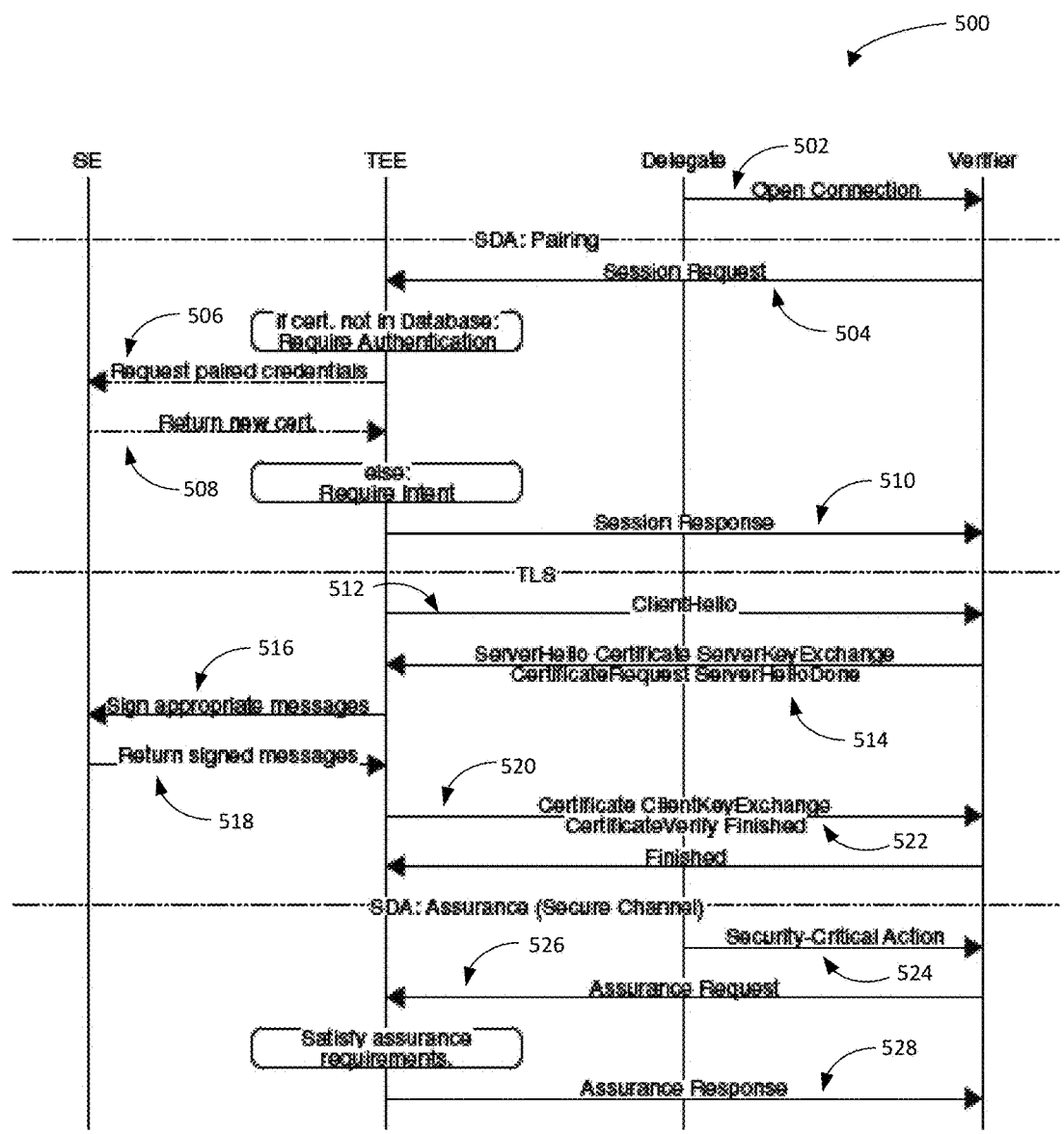
FIG. 5 illustrates a communication protocol per the device authentication system, according to an example embodiment.

FIG. 5 illustrates how the TLS protocol can be integrated within the device authentication system framework. The device authentication system depends on the ability to establish a secure session that is an encrypted and authenticated channel between the trusted OS within the authentication device, and the third party verifier. The device authentication system described herein is not tied to any specific cryptographic algorithms, which enables the system to be easily adapted to the ever-changing cryptographic landscape. In a non-limiting example implementation however, the device authentication system employs Transport Layer Security (TLS), leveraging OpenSSL, to establish the secure session.

FIG. 5 illustrates a communication protocol 500 utilized by the device authentication system, according to an example embodiment. The protocol 500 begins with the delegate requesting an open connection with the third party verifier at step 502. The delegate is a device or application to which the user can delegate some privileges in order to take some action. The delegate may be a laptop, an application on the laptop, or an application on the user authentication device. For example, a Google Chrome web browser application on the user authentication device may be a delegate application that the user uses to interact with the third-party verifier. In this case, the Chrome web browser application opens a connection to the third-party verifier's server and attempts to establish a TLS session. In establishing the session, the Chrome web browser application may need to interact with the TEE of the user authentication device to obtain authentication for interactions with the third-party verifier.

At step 504, the verifier transmits a session request to the TEE of the user authentication device. If a pinned certificate for the verifier is not found in the database or memory of the user authentication device, then the TEE requests paired credentials from the SE (step 506). In an example embodiment, the method 500 requires intent assurance from the user to pair new keys and to initiate a secure session. At step 508, the SE returns a new pinned certificate to the TEE for the verifier.

If a pinned certificate is found in the database, then the example method 500 requires intent assurance to start a TLS session regardless of the previously established pairing. This step aids in thwarting relay attacks at the user authentication device.

At step 510, the TEE transmits a session response to the verifier to establish a secure communication session. At step 512, the TEE transmits a ClientHello message to the verifier over the secure communication session.

At step 514, the verifier transmits a message to the TEE presenting its credentials to the user authentication device along with metadata. The metadata may indicate the supported cryptographic suites and schemes, along with other information needed to authenticate interactions between the authentication device and the verifier.

At step 516, the TEE requests the SE to sign (encrypt) appropriate messages based on the message received from the verifier at step 514. At step 518, the SE returns the signed messages to the TEE. The TEE forwards a response message to the verifier in response to the message received in step 514. At step 522, the verifier transmits a finish message to the TEE to complete establishing the secure communication session.

Per the assurance protocol, the delegate transmits a security critical action message to the verifier (step 524). The verifier sends an assurance request to the TEE at step 526. When the user satisfies the assurance requirements, the TEE transmits an assurance response to the verifier (step 528). For example, the Chrome® web browser may be the delegate service that the user uses to interact with his or her bank account. The Chrome® web browser issues a security critical action message to the bank server (e.g., HTTPS request to transfer money) based on input from the user via the web browser. The bank server transmits an assurance request, for example an identification assurance to authenticate interactions with the user authentication device. The user provides the identification assurance via the secure input/output interface to the TEE. Once the assurance request is satisfied, the request to transfer money is performed.

FIG. 6A is a state machine diagram for the device authentication communication protocol for the third party verifier, according to an example embodiment. FIG. 6B is a state machine diagram for the device authentication communication for the user authentication device, according to an example embodiment.

In FIGS. 6A and 6B, dashed lines indicate an unaccepted message, solid lines are state transitions, S_ denotes a session message, A_ denotes an assurance message, ↑ indicates a sent message, ↓ indicates a received message, and ⇓ indicates user input.

The state machine diagrams illustrate the features of the device authentication system. For example, in one embodiment a session cannot be established in the authentication device without user approval and authentication device must have a session established before responding to any assurance requests. In an embodiment, neither intent nor identification assurance requests can be satisfied without user input, and a positive user response. In one embodiment the third party verifier only receives a positive response for intent and identification assurance requests if the user approves.

In an exemplary threat model employed by an embodiment of the device authentication system, the exposed surfaces of the TCB are the interactions between the TEE and the rest of the system (e.g., shared memory, buses, or peripherals), high-level user interactions with the I/O, and any cryptographic assumptions implemented in the system. It should be appreciated that the SE and I/O interface should be properly segregated between the TEE and rich OS. Any flaws in this segregation may be leveraged by unauthorized parties to compromise exposed components. In an example embodiment, these potential attacks may be mitigated by utilizing dedicated hardware, but at the cost of usability.

Another possible attack vector may be to obtain code execution within the TEE, which also has access to the SE and I/O interface. The device authentication system explicitly restricts the interactions between the TEE and the external world to a single channel (e.g., step 4 in FIG. 4). Thus, the only exposed attack surface is the code that handles those input messages. However, there is a precedent for installing numerous "trustlets" (i.e., third-party applications) within the TEE that also have interfaces to the rich OS. A vulnerability in any co-resident application could be used to compromise the entire TEE and thus compromise the security of the device authentication system. Similarly, peripherals on the authentication device (e.g., the baseband processor) may have direct memory access and could potentially compromise the TEE. While existing hardware architectures provide protections against these types of attacks, this segregation must be properly configured; any oversight could be a potential vulnerability. Moreover, the device authentication system relies on secure boot to ensure the security of the system. Therefore, any potential vulnerabilities in this trusted-boot chain could be leveraged to compromise the TEE.

Traditional phishing attacks typically aim to steal the user's credentials (e.g., username and password or credit card information). The device authentication system mitigates these credential stealing attempts as well as man-in-middle attacks by utilizing pinned certificates and the SE. However, the potential for an attacker to "trick" the user into inputting valuable information into an attacker-run service still exists. The TEE indicator mitigates attempts to masquerade as the system's trusted interface and restricts the attacker to using legitimate messages. The device authentication system attempts to mitigate phishing attempts by verifying certificates and displaying explicit messages to the users about with whom they are communicating. However, the burden of protecting personal information still ultimately falls on the user. Relay attacks, which involve relaying communications between the user's device and a remote resource without the user's knowledge, have long been a problem with authentication tokens. The device authentication system described herein mitigates these attacks by requiring an assurance response from the user (e.g., intent assurance) before establishing a secure session with any third party verifier.

Finally, while compromising a third party verifier would leak the user's information on that particular service, it would not compromise the security of the user's credentials from the authentication device on other verifiers. With physical access to the authentication device, an attacker would be able to access any services that require presence or intent. However, any actions requiring identification would still be inaccessible, unless the attacker was also able to obtain the appropriate authentication data (e.g., a PIN or biometric). Additionally, many devices already employ locking mechanisms to combat this problem. Furthermore, attacks that rely on physical access are inherently unscalable and limit the attacker to be someone in close physical proximity.

The device authentication system includes an assurance model, a secure I/O interface, and the ability to deploy on commodity devices and interact with existing services without the need for additional hardware or network connectivity. These features are clear differentiators from conventional authentication schemes.

Figure 7:
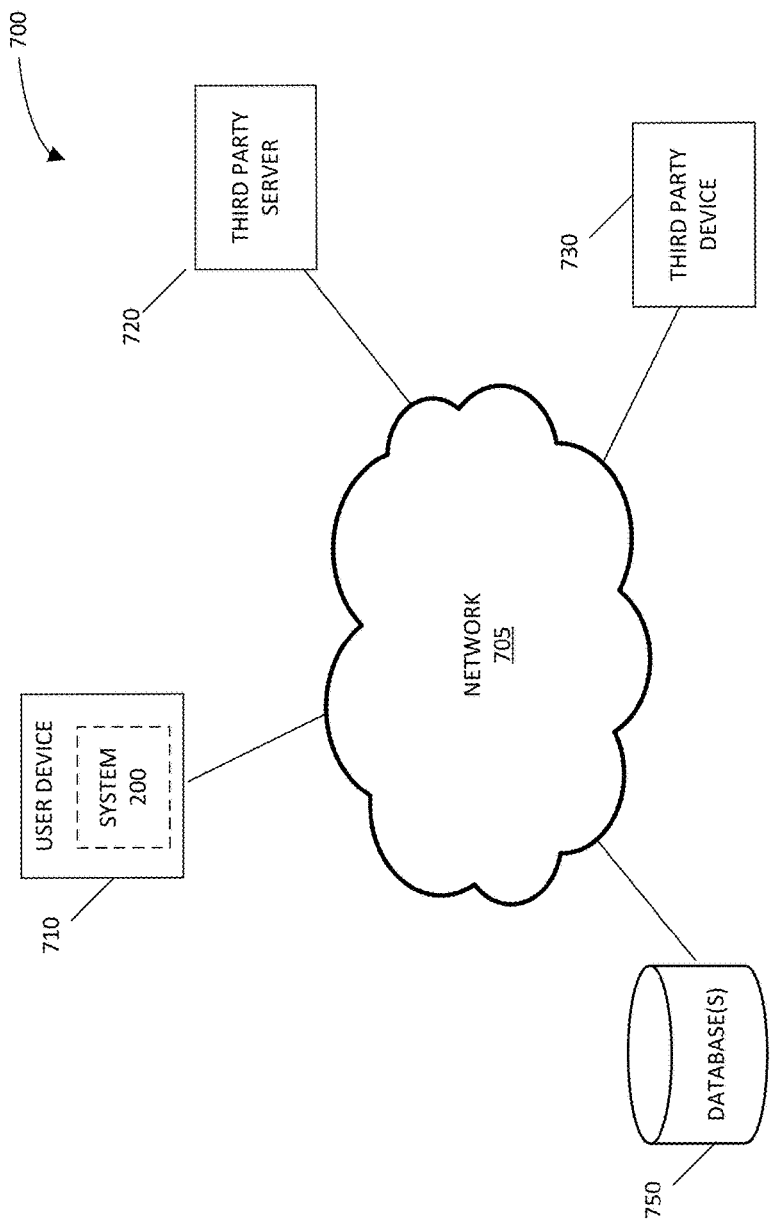
FIG. 7 illustrates a network diagram depicting a system for implementing the device authentication system, according to an example embodiment.

FIG. 7 illustrates a network diagram depicting a system 700 for implementing the device authentication system, according to an example embodiment. The system 700 can include a network 705, user device 710, third party server 720, third party device 730, and database(s) 750. Each of components 710, 720, 730, 740, and 750 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user device 710 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, mini-computers, and the like. The user device 710 can include one or more components described in relation to computing device 800 shown in FIG. 8.

The user device 710 may connect to network 705 via a wired or wireless connection. The user device 710 may include one or more applications such as, but not limited to, a web browser application and the device authentication system described herein.

The third party device 730 may comprise, but is not limited to, computers, Internet appliances, wireless devices, portable devices, wearable computers, cellular or mobile phones, portable digital assistants (PDAs), smart phones, tablets, ultrabooks, netbooks, laptops, multi-processor systems, microprocessor-based or programmable consumer electronics, mini-computers, and the like. The third party device 730 can include one or more components described in relation to computing device 800 shown in FIG. 8.

In an example embodiment, the user device 710 may be the user authentication device and include the device authentication system 200. The third party server 720 may be the third party verifier that generates and transmits a request for authentication, and the third party device 730 may be the delegate.

Each of the third party server 720, third party device 730 and the database(s) 750 is connected to the network 705 via a wired connection. Alternatively, one or more of the server 720, third party device 730 and the database(s) 750 may be connected to the network 705 via a wireless connection. The server 720 comprises one or more computers or processors configured to communicate with the user device 710, the third party device 720 and database(s) 750 via network 705. The server 720 hosts one or more applications or websites accessed by the user device 710 and/or facilitates access to the content of database(s) 750. Database(s) 750 comprise one or more storage devices for storing data and/or instructions (or code) for use by the user device 710, the server 720, and the third party devices 730. The database(s) 750, and/or the server 720, may be located at one or more geographically distributed locations from each other or from the user device 710 and the third party device 730. Alternatively, the database(s) 750 may be included within the server 720.

Figure 8:
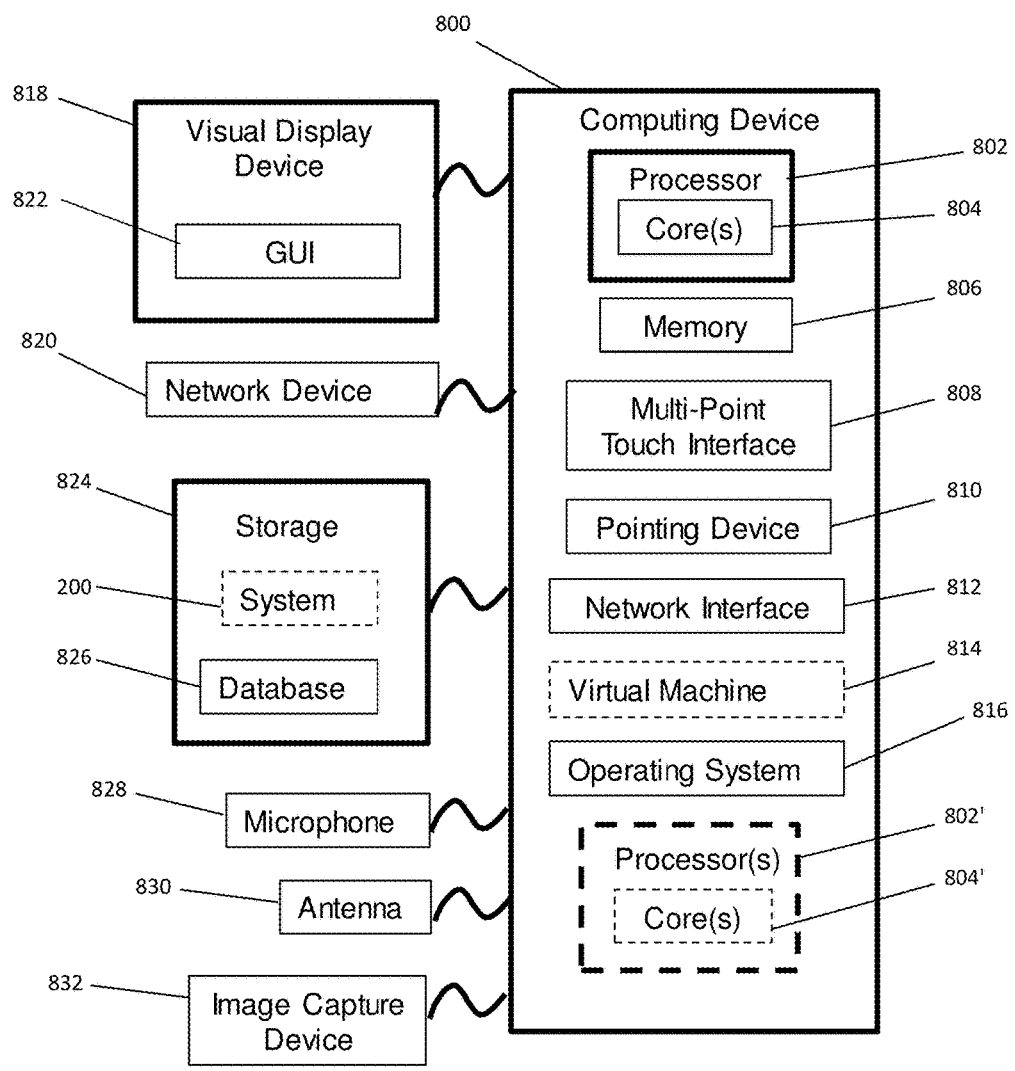
FIG. 8 is a block diagram of an exemplary computing device that can be used to implement exemplary embodiments of the device authentication system described herein.

FIG. 8 is a block diagram of an exemplary computing device 800 that may be used to implement exemplary embodiments of the device authentication system 200 described herein. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the device authentication system. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor. In some embodiments, the processor 802 may provide the TEE for the device authentication system described herein.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through touch-enabled display surface which may display one or more graphical user interfaces 822 that may be provided in accordance with exemplary embodiments. The computing device 800 may include other I/O devices for receiving input from a user, for example, a keyboard, touch-screen, or any suitable multi-point touch interface 808, a pointing device 810 (e.g., a mouse), a microphone 828, and/or an image capturing device 832 (e.g., a camera or scanner). The multi-point touch interface 808 (e.g., keyboard, pin pad, scanner, touch-screen, etc.) and the pointing device 810 (e.g., mouse, stylus pen, etc.) may be coupled to the visual display device 818. The computing device 800 may include other suitable conventional I/O peripherals. The multi-point touch interface 808, pointing device 810, and the image capturing device 832 may be the secure I/O interface via which the user can provide a response to the assurance request and/or requests from third party verifiers for information.

The computing device 800 may also include one or more storage devices 824, such as a hard-drive, CD-ROM, or other computer readable media, for storing data and computer-readable instructions and/or software that implement exemplary embodiments of the device authentication system described herein. Exemplary storage device 824 may also store one or more databases for storing any suitable information required to implement exemplary embodiments. For example, exemplary storage device 824 can store one or more databases 826 for storing information to be used by embodiments of the system 200. The databases may be updated manually or automatically at any suitable time to add, delete, and/or update one or more items in the databases.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 800 can include one or more antennas 830 to facilitate wireless communication (e.g., via the network interface) between the computing device 800 and a network. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 800 may run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

The device authentication system described herein is a usable hardware-based cross-domain (i.e., digital and physical) authentication scheme, that can be implemented on existing commercial hardware. The device authentication system is able to provide improvements over conventional authentication mechanisms, in many cases providing users with both better security and a more enjoyable experience.

This is made possible by the granular assurance model, which permits the verifier to meet its security assurances (i.e., presence, intent, identification), without unnecessarily burdening the user. The introduction of two primitives is accommodated—a mechanism for the verifier to request for the encryption and decryption of data, and a post-authentication bi-directional trusted path between the user and the verifier.

The description contained herein is presented to enable a person skilled in the art to create and use a device authentication system. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for authenticating user device interactions with an external application or device, the method comprising:
   establishing a secure communication session between trusted code executing within a trusted execution environment in a user authentication device and the external application or device, the external application or device external to the trusted execution environment, the user authentication device configured to receive input from a plurality of types of assurance actions;
   receiving, in response to establishing the secure communication session, an authentication request from the external application or device at the trusted execution environment over the secure communication session, the authentication request requesting a specified type of required user assurance action from the plurality of types of assurance actions to authenticate a user;
   establishing, in response to receiving the authentication request, a secure communication channel between the trusted execution environment and an input/output interface of the user authentication device;
   receiving, in response to establishing the secure communication channel, input from a user assurance action related to the authentication request over the secure communication channel, the user assurance action being the specified type of required user assurance action;
   encrypting, in response to receiving input from the user assurance action, at a secure element of the user authentication device based on the authentication request; and
   transmitting a response to the authentication request that includes the encrypted data and an indicator of the user assurance action to the external application or device from the trusted execution environment over the secure communication session to enable the user authentication device to interact with the external application or device.

2. The method of claim 1, further comprising:
   generating asymmetric key-pairs for the external application or device and the user authentication device;
   storing the key-pairs as paired credentials in the secure element of the user authentication device; and
   wherein the secure communication session between the user authentication device and the external application or device is established based on the generated key-pairs.

3. The method of claim 1, further comprising:
   searching secure memory of the user authentication device for stored key-pairs for the external application or device; and
   wherein the secure communication session between the user authentication device and the external application or device is established based on locating the key-pairs.

4. The method of claim 1, wherein a user providing the assurance action over the secure communication channel is first presented with the display of an image previously stored by the user in secure memory in the trusted execution environment as an indication of the secure communication channel being secure.

5. The method of claim 1, wherein the secure element of the user authentication device is a smart card.

6. The method of claim 1, wherein the secure element of the user authentication device is a SIM card on a user's smartphone.

7. The method of claim 1, wherein the input/output interface of the user authentication device is a touch-screen interface of the user authentication device or a camera of the user authentication device.

8. The method of claim 1, wherein the user authentication device includes a system-on-chip (SoC) providing the trusted execution environment and the trusted code.

9. The method of claim 1, wherein the plurality of types of assurance actions includes one of presence, intent, and identification.

10. A system for authenticating user device interactions with an external application or device, the system comprising:
    a user authentication device including:
       a processor configured to interact with a trusted execution environment of the user authentication device;
       an input/output interface; and
       a secure element, wherein the user authentication device is configured to establish a secure communication session between trusted code executing within the trusted execution environment of the user authentication device and the external application or device, the external application or device external to the trusted execution environment, the user authentication device configured to receive input from a plurality of types of assurance actions, wherein the trusted execution environment is configured to:
    receive an authentication request from the external application or device over the secure communication session, the authentication request requesting a specified type of required user assurance action from the plurality of types of assurance actions to authenticate a user,
    establish, in response to receiving the authentication request, a secure communication channel between the trusted execution environment and the input/output interface of the user authentication device, and
    receive, in response to establishing the secure communication channel, input from a user assurance action related to the authentication request over the secure communication channel, the user assurance action being the specified type of required user assurance action, and wherein the secure element is configured to encrypt data based on the authentication request, and
    the trusted execution environment is further configured to transmit a response to the authentication request that includes the encrypted data and an indicator of the user assurance action to the external application or device over the secure communication session to enable the user authentication device to interact with the external application or device.

11. The system of claim 10, wherein the trusted execution environment is further configured to:
    generate asymmetric key-pairs for the external application or device and the user authentication device;
    store the key-pairs as paired credentials in the secure element of the user device; and
wherein the secure communication session is established between the user device and the external application or device based on the generated key-pairs.

12. The system of claim 10, wherein the trusted execution environment is further configured to:
    search secure memory of the user authentication device for stored key-pairs for the external application or device; and
wherein the secure communication session is established between the user authentication device and the external application or device based on locating the key-pairs.

13. The system of claim 10, wherein a user providing the assurance action over the secure communication channel is first presented with the display of an image previously stored by the user in secure memory in the trusted execution environment as an indication of the secure communication channel being secure.

14. The system of claim 10, wherein the secure element of the user authentication device is a smart card.

15. The system of claim 10, wherein the secure element of the user authentication device is a SIM card on a user's smartphone.

16. The system of claim 10, wherein the input/output interface of the user authentication device is a touch-screen interface of the user authentication device or a camera of the user device.

17. The system of claim 10, wherein the user authentication device includes a system-on-chip (SoC) providing the trusted execution environment and the trusted code.

18. The system of claim 10, wherein the plurality of types of assurance actions includes one of presence, intent, and identification.

19. A non-transitory computer readable medium storing instructions executable by a processor for authenticating user device interactions with an external application or device, the instructions when executed causing a user authentication device to:
    establish a secure communication session between trusted code executing within a trusted execution environment in a user authentication device and the external application or device, the external application or device external to the trusted execution environment, the user authentication device configured to receive input from a plurality of types of assurance actions;
    receive, in response to establishing the secure communication session, an authentication request from the external application or device at the trusted execution environment over the secure communication session, the authentication request requesting a specified type of required user assurance action from the plurality of types of assurance actions to authenticate a user;
    establish, in response to receiving the authentication request, a secure communication channel between the trusted execution environment and an input/output interface of the user authentication device;
    receive, in response to establishing the secure communication channel, input from a user assurance action related to the authentication request over the secure communication channel, the user assurance action being the specified type of required user assurance action;
    encrypt, in response to receiving input from the user assurance action, at a secure element of the user authentication device based on the authentication request; and
    transmit a response to the authentication request that includes the encrypted data and an indicator of the user assurance action to the external application or device from the trusted execution environment over the secure communication session to enable the user authentication device to interact with the external application or device.

20. The non-transitory computer readable medium of claim 19, wherein the instructions when executed further cause the user authentication device to:
    generate asymmetric key-pairs for the external application or device and the user authentication device;
    store the key-pairs as paired credentials in the secure element of the user authentication device; and
wherein the secure communication session is established between the user authentication device and the external application or device based on the generated key-pairs.

21. The non-transitory computer readable medium of claim 19, wherein the instructions when executed further cause the user authentication device to:
    search secure memory of the user authentication device for stored key-pairs for the external application or device; and
wherein the secure communication session is established between the user authentication device and the external application or device based on locating the key-pairs.

22. The non-transitory computer readable medium of claim 19, wherein a user providing the assurance action over the secure communication channel is first presented with the display of an image previously stored by the user in secure memory in the trusted execution environment as an indication of the secure communication channel being secure.

23. The non-transitory computer readable medium of claim 19, wherein the plurality of types of assurance actions includes one of presence, intent, and identification.

* * * * *